United States Patent
Solé Simó et al.

(10) Patent No.: US 10,548,022 B1
(45) Date of Patent: Jan. 28, 2020

(54) DISTRIBUTED LEDGER FOR WIRELESS CHANNEL ASSIGNMENT

(71) Applicant: CA, Inc., New York, NY (US)

(72) Inventors: Marc Solé Simó, Barcelona (ES); Victor Muntés-Mulero, Sant Feliu de Llobregat (ES); Steven L. Greenspan, Philadelphia, PA (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 16/115,218

(22) Filed: Aug. 28, 2018

(51) Int. Cl.
| | |
|---|---|
| *H04W 72/04* | (2009.01) |
| *H04K 3/00* | (2006.01) |
| *G06Q 20/06* | (2012.01) |
| *H04W 16/16* | (2009.01) |
| *H04W 24/02* | (2009.01) |

(52) U.S. Cl.
CPC .......... *H04W 16/16* (2013.01); *G06Q 20/065* (2013.01); *H04K 3/42* (2013.01); *H04W 24/02* (2013.01); *H04W 72/0426* (2013.01)

(58) Field of Classification Search
CPC . H04W 16/16; H04W 72/0426; H04W 24/02; H04K 3/42; G06Q 20/065
See application file for complete search history.

(56) References Cited

U.S. PATENT DOCUMENTS

| | | | |
|---|---|---|---|
| 2003/0004799 A1 | 1/2003 | Kish et al. | |
| 2015/0237503 A1* | 8/2015 | Buddhikot | H04W 16/10 455/452.1 |
| 2019/0043024 A1* | 2/2019 | Lancashire | G06Q 20/06 |

OTHER PUBLICATIONS

Buragohain, et al., "A Game Theoretic Framework for Incentives in P2P Systems", IEEE Proceedings Third International Conference on Peer-to-Peer Computing, Sep. 2003, 9 pages, retrieved on May 2, 2018 from https://www.cs.ucsb.edu/~suri/psdir/incentives.pdf.
De La Hoz, et al., "Multi-Agent Nonlinear Negotiation for Wi-Fi Channel Assignment", Autonomous Agents and Multiagent Systems, May 2017, pp. 1035-1043, retrieved on May 1, 2018 from http://www.ifaamas.org/Proceedings/aamas2017/pdfs/p1035.pdf.
Han, et al., "Distributive Opportunistic Spectrum Access for Cognitive Radio Using Correlated Equilibrium and No-Regret Learning", Wireless Communications and Networking Conferences, Mar. 2007, pp. 11-15, retrieved on May 2, 2018 from http://sig.umd.edu/publications/Han_WCNC_200703.pdf.

* cited by examiner

*Primary Examiner* — Joseph E Dean, Jr.
(74) *Attorney, Agent, or Firm* — Gilliam IP PLLC

(57) ABSTRACT

A digital currency driven channel assignment technique is disclosed. Each AP in a distributed network uses a channel selection manager and a distributed ledger to select channels according to a channel assignment and a digital currency associated with the distributed ledger. The digital currency incentivizes APs to make sacrifices in their channel selection for the benefit of the overall network while punishing APs that select channels selfishly and cause bandwidth interference.

20 Claims, 7 Drawing Sheets

DISTRIBUTED LEDGER FOR WIRELESS CHANNEL ASSIGNMENT

BACKGROUND

The disclosure generally relates to the field of networking, and more particularly to wireless channel assignment.

Wireless data can be communicated over a number of channels which denote predetermined frequency ranges. A wireless access point ("AP") includes one or more radios that each operate (i.e., transmit and receive data) over channels for which the radio is configured. Although businesses typically plan deployment of access points for a network, some businesses and residential users do not. With increasing AP density (e.g., multifamily residences and downtown areas), interference cannot be avoided due to channel overlap and exhaustion of available channels that do not overlap.

BRIEF DESCRIPTION OF THE DRAWINGS

Aspects of the disclosure may be better understood by referencing the accompanying drawings.

DESCRIPTION

Figure 1:
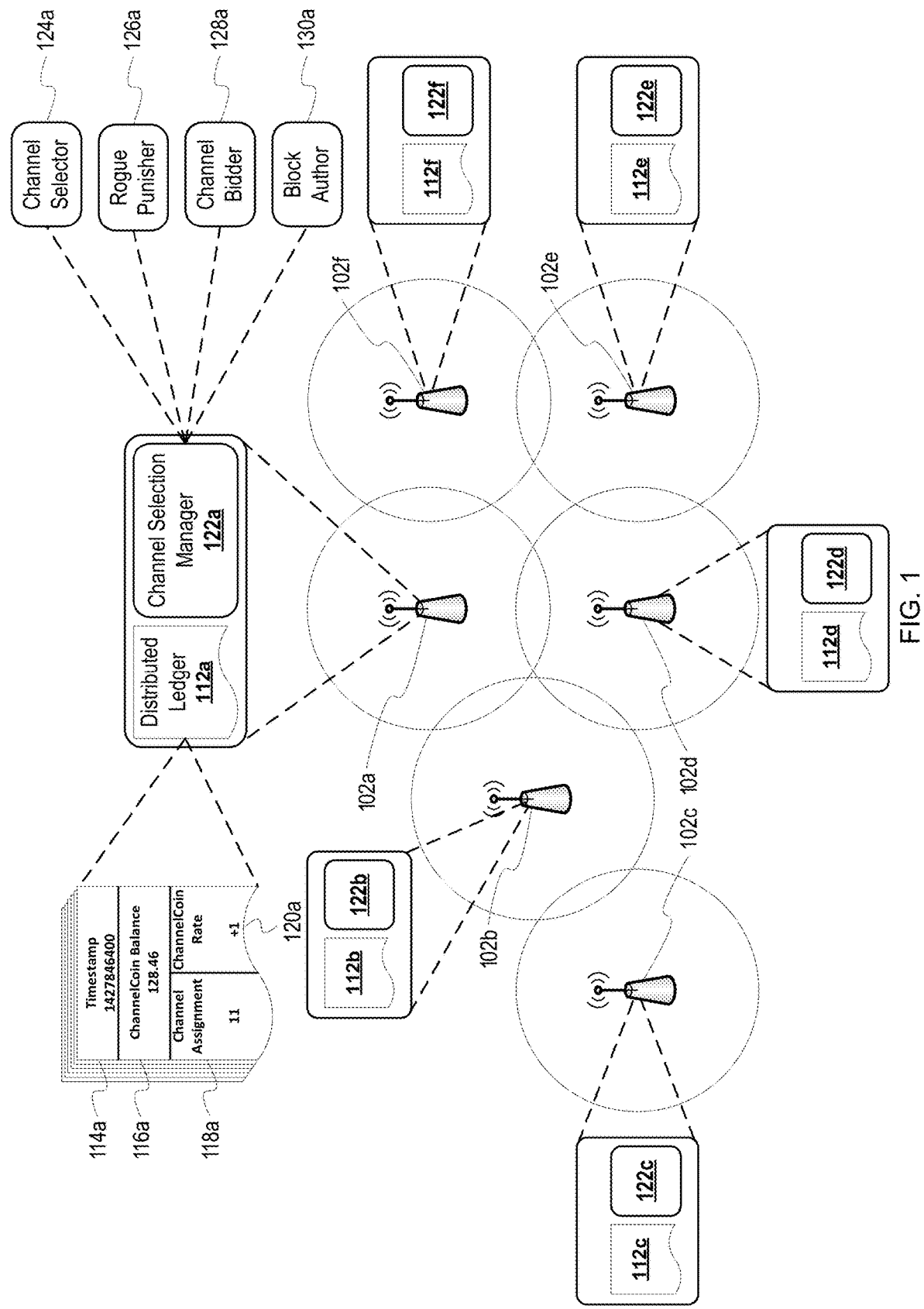
FIG. 1 depicts an example distributed network in which access points select channels using a channel assignment manager and a distributed ledger.

The description that follows includes example systems, methods, techniques, and program flows that embody aspects of the disclosure. However, it is understood that this disclosure may be practiced without these specific details. For instance, this disclosure refers to a problem domain specific digital currency, "ChannelCoin," but other digital currencies could be used that are not specific to the domain of wireless channel assignment. Aspects of this disclosure can be instead applied to other digital currencies. In other instances, well-known instruction instances, protocols, structures and techniques have not been shown in detail in order not to obfuscate the description.

INTRODUCTION

Wireless channels comprise a range of frequencies associated with a bandwidth distribution. However, different channels may have overlapping frequency ranges, in which case bandwidth interference between signals using overlapping channels may occur. This causes bandwidth to be diminished for one or both signals. While one or several APs may be able to acquire full bandwidth in a distributed network of APs, selfish channel selection may reduce the total bandwidth of a distributed network of APs. With the advent of mobile and "smart" devices, an increasing number of APs operate in the same space. As AP density continues to increase, so does bandwidth interference.

Overview

To reduce the impact of selfish channel selection, a digital currency driven channel assignment technique has been developed. In a distributed network, there is no central control unit or authority, so each AP is allowed to make self-interested decisions. A Nash equilibrium is a steady-state scenario for a number of self-interested parties acting to guarantee optimal payout in a game or transaction. As applied to a distributed network with free channel selection, a Nash equilibrium may be realized with each AP operating over the channel which provides them the greatest bandwidth. However, this may cause a significant amount of bandwidth interference and network instability. By implementing a channel assignment mechanism among neighboring APs, each AP can optimize their own bandwidth without compromising the overall network stability or performance. This can be achieved with changing the optimal channel assignment for APs to align with what is beneficial for the distributed network. By introducing a distributed ledger associated with a digital currency, the Nash equilibrium is shifted towards promoting overall network stability and performance. This is achieved by using a digital currency to incentivize APs to make sacrifices in their channel selection for the benefit of the overall network while punishing APs that select channels selfishly and cause bandwidth interference for neighboring APs. To manage channel assignment, the APs use a distributed ledger to track a digital currency and earning rates of the digital currency based in addition to channel assignments, which balances individual bandwidth against overall network stability and performance. Earning rates, which can be positive or negative, are adjusted based on sacrifice in bandwidth among the participating APs when assigning channels. Using a distributed ledger to manage channel assignments allows coordination of channel assignments in a manner that maintains network stability without a central control or authority.

Example Illustrations

FIG. 1 depicts an example distributed network in which access points select channels using a channel selection manager and a distributed ledger. A set of APs 102a-f with distributed ledgers 112a-f and with channel selection managers 122a-f form a distributed network with a channel assignment mechanism. As an illustrative example, the AP 102a with the distributed ledger 112a and the channel selection manager 122a is described below. Each of the APs 102b-f with distributed ledgers 112b-f and channel selection managers 122b-f also hold the properties described below.

The AP 102a is a wireless access point which may transmit and receive data wirelessly over one or more channels. Each channel corresponds to a frequency range for wireless communications and can support a limited bandwidth. Some channels may have overlapping frequency, leading to bandwidth interference for wireless devices which communicate data over shared frequencies. Depending upon the type of AP, the AP 102a may be able to communicate over more than one channel simultaneously and each AP 102a-f may have different communication capacities.

A circle is shown about the AP 102a to represent wireless range. When two APs are in range of one another, bandwidth interference may occur for overlapping channels. For example, AP 102a and AP 102b may have bandwidth interference if they operate on the same channel. APs which are in range of one another are hereafter referred to as "neighboring APs". In some cases, each AP may have a different range.

The AP 102a in the distributed network uses the distributed ledger 112a and the channel selection manager 122a to manage channel selection using a digital currency associated with the distributed ledger 112a. The distributed ledger 112a is comprised of a number of blocks, each block containing information on each AP 102a-f in the distributed network. The distributed ledger 112a is associated with a digital currency called "ChannelCoin". ChannelCoin may be rewarded to or spent by APs 102a-f in the distributed network during various operations. Earn rates are hereafter referred to as "ChannelCoin rates". The information contained in each block of the distributed ledger 112a may comprise a timestamp 114a, a ChannelCoin balance 116a, a channel assignment 118a, or a ChannelCoin rate 120a for each AP 102a-f in the distributed network. While the distributed ledger 112a contains information on each AP 102a-f, only information on the AP 102a is shown for illustrative purposes. In some cases, a blockchain may also be used instead of a distributed ledger.

Blocks are hereafter distinguished as either "blocks" or "assignment blocks". Assignment blocks comprise at least channel assignments and ChannelCoin rates. Regular blocks may contain various information relevant to the channel assignment process.

The timestamp 114a may be recorded as a UTC timestamp. Information added as a block to the distributed ledger is associated with a timestamp. Examples of information that may be added as a block to the distributed ledger include ChannelCoin balances, ChannelCoin expenditures, and channel use of each AP in the distributed network. Information in the distributed ledger 112a may be associated with the media access control (MAC) address of each AP 102a-f to verify their identities in the distributed network.

The ChannelCoin balance 116a denotes the amount of ChannelCoin possessed by the AP 102a at the time of the timestamp 114a. Each AP 102a-f may record ChannelCoin changes as new blocks between the authoring of new assignment blocks. The recording of changes in ChannelCoin balances can be based on the passing of a predetermined amount of time, fines, or an expenditure of ChannelCoin. Each time an AP records a change in ChannelCoin balance, a timestamp is also recorded.

The APs 102a-f may audit appended ChannelCoin balances based on detected channel use of neighboring APs and ChannelCoin rates available in the distributed ledger. For example, if the AP 102a reports that it has been using channel 11 as assigned but the AP 102b detects that the AP 102a has been using channel 6, a fine may be issued to the AP 102a. A ChannelCoin fine may also be implemented for falsifying ChannelCoin balances or any other information on the distributed ledger. ChannelCoin fines may be issued by either the AP which detects the behavior that resulted in the fine or the last AP to author an assignment block. The ChannelCoin rate 120a is a ChannelCoin rate for the channel assigned to the AP 102a. A ChannelCoin rate indicates the reward in ChannelCoin for using a specified channel for a unit of time (e.g., milliseconds, seconds, or minutes). For example, a ChannelCoin rate for the AP 102a may specify that the AP 102a would gain 1 ChannelCoin by using the assigned channel (channel 11) for one minute. Each AP 102a-f may select channels based on assigned channels and may spend ChannelCoin to improve their channel assignment.

In some cases, APs in the distributed network may divide channels using channel multiplexing to share the same channels. APs may negotiate sharing a channel to reduce bandwidth interference by transmitting on the same channel with distinct frequency ranges through a coordinated division.

The channel selection manager 122a is part of a channel assignment mechanism that comprises a channel selector 124a, a rogue punisher 126a, channel bidder 128a, a block author 130a, and the distributed ledger 112a. The channel selector 124a and the rogue punisher 126a assist in optimizing performance of the AP 102a. The channel bidder 128a and the block author 130a are utilized by the AP 102a to interact with the distributed ledger 112a to update the channel assignment 118a and the ChannelCoin rate 120a using a distributed algorithm.

The channel selector 124a selects channels for the AP 102a. The channel selector 124a selects channels according to channel assignment.

For APs which do not act towards the overall stability and performance of the distributed network (e.g., APs which consistently select channels which are not assigned to them), ChannelCoin will be deducted until depleted. APs with negative ChannelCoin are defined as "rogue APs". As an example, the AP 102a may select channels which are not the assigned channel (channel 11) to improve bandwidth. When using channels which are not assigned to it, the AP 102a may be issued ChannelCoin fines. Upon acquiring a negative ChannelCoin balance 116a, the AP 102a is defined as a "rogue AP" for consistently acting against the overall performance and stability of the distributed network. Because the AP 102a is a rogue AP, different methods are used to coerce the AP 102a into using their assigned channels. These methods are facilitated by rogue punishers (e.g., the rogue punisher 126a). For example, neighboring APs may jam the channels used by the rogue AP 102a. Jamming methods, protocols, or programs may be included as components of the rogue punisher 126a. As a rogue AP, the AP 102a is unable to take part in assignment block authoring processes and is punished with channel jamming of unassigned channels. Once the AP 102a returns to a positive ChannelCoin balance, it will no longer be defined as a rogue AP. In some cases, the ChannelCoin threshold for rogue AP status may be above or below zero. The operations of the rogue punisher 126a are explored in greater detail by the FIGS. 5 and 6 descriptions.

Assignment block authoring processes allow APs to change their channel assignments by authoring a new assignment block for the distributed ledger. The distributed ledger uses a Proof of Stake system to achieve distributed consensus on which AP will author the new assignment block. In the Proof of Stake system, one AP is selected to record the outcome of assignment block authoring processes (based on an optimization problem solved with a distributed algorithm) based on a randomized algorithm that considers the balance of each node to increase its probabilities of authoring the next block. APs can bid ChannelCoin to initiate or improve the outcome of the distributed optimization process. To prevent centralization, the amount of ChannelCoin which may be considered for selecting the next writer may be limited to a predetermined threshold to prevent APs with a large number of ChannelCoin from manipulating the distributed ledger 112a.

Different events can initiate the assignment block authoring process. Examples of events include the expiration or lapse of a time period, a detected change in the network beyond a given threshold (e.g., degradation or improvement in available bandwidth), change in neighbor membership, manual request, etc. Assignment block authoring processes comprise solving a distributed optimization problem and a Proof of Stake system to select an authoring AP and result in the authoring and distribution of a new assignment block for the distributed ledger 112a. APs may use the channel selection manager 122a to take part in the Proof of Stake system and author a new assignment block for the distributed ledger 112a. For example, the AP 102a may use the block author 130a to take part in the distributed optimization problem to author a new assignment block for the distributed ledger 112a. The AP 102a may use the channel bidder 128a to spend ChannelCoin from the ChannelCoin balance 116a to improve the outcome of the distributed optimization problem or to initiate a distribute optimization problem.

If selected by the Proof of Stake system during an assignment block authoring process, the AP 102a authors a new assignment block for the distributed ledger 112a. The new assignment block is timestamped with timestamp 114a at the time of authoring and the AP 102a uses values determined by solving the distributed optimization problem for the channel assignment and ChannelCoin rate of each AP in the distributed network. The new assignment block is then shared with AP 102b, AP 102d, and AP 102f, which in turn share the assignment block with AP 102c and AP 102e. Each AP adds a ChannelCoin balance to the distributed ledger upon receipt of the new assignment block from a neighboring AP. The new assignment block is shared between neighboring APs until the distributed ledger 112a is identical for all APs in the distributed network.

Figure 2:
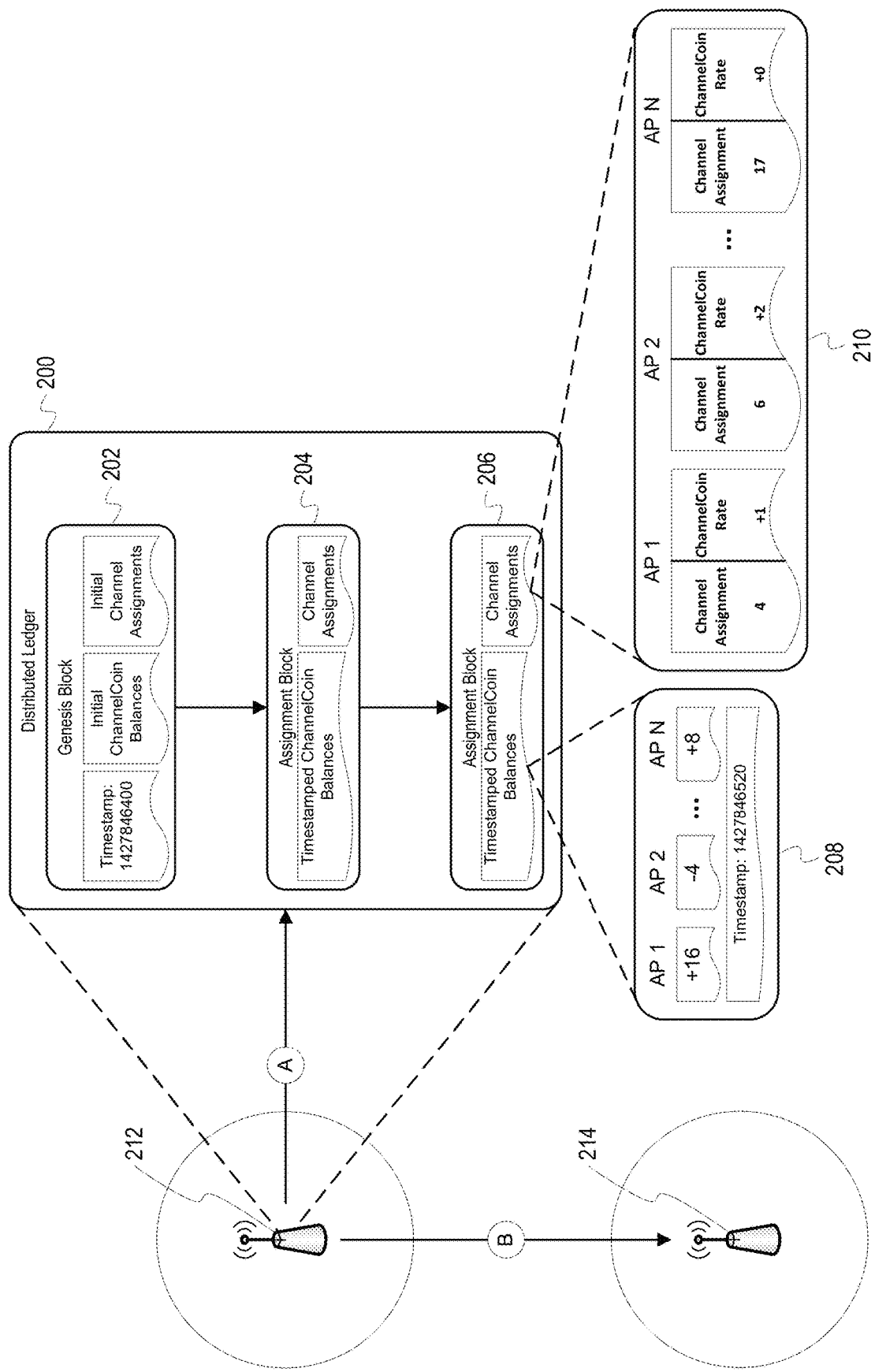
FIG. 2 depicts an example AP authoring and distributing a new assignment block for a distributed ledger.

FIG. 2 depicts an example AP authoring and distributing a new assignment block for a distributed ledger. A distributed ledger 200 comprises a genesis block 202, an assignment block 204, and an assignment block 206. The assignment block 206 includes timestamped ChannelCoin balances 208 and channel assignments 210. An AP 212 and an AP 214 are part of a distributed network.

The genesis block 202 comprises a timestamp, initial ChannelCoin balances, and initial channel assignments. The timestamp may be provided in UTC format. For example, the UTC timestamp for the genesis block 202 may be 1427846400. The initial ChannelCoin balances may be set to zero. Initial channel assignments may be determined by minimizing bandwidth interference between APs. An appropriate distributed optimization problem for minimizing bandwidth interference to determine channel assignments for a new assignment block is introduced in the FIG. 3 description.

The next assignment block in the distributed ledger 200, assignment block 204, includes timestamped ChannelCoin balances and channel assignments for each AP in the distributed network. Timestamps and ChannelCoin balances are recorded as APs in the distributed network earn or spend ChannelCoin. A number of blocks may be authored between the authoring of the genesis block 202 and each of the assignment blocks 204, 206.

Authoring an assignment block for the distributed ledger 200 comprises solving a distributed optimization problem to minimize bandwidth interference in order to generate new channel assignments. The new ChannelCoin rates are determined by the sacrifice in bandwidth each AP must make to use their assigned Channel. For example, if the AP 214 is assigned a channel which has 15 Mbps of effective bandwidth (due to bandwidth interference) while another channel could provide 30 Mbps of effective bandwidth, the AP 214 will have a high ChannelCoin rate because it must sacrifice half of its bandwidth to use its assigned channel. A precise metric for determining ChannelCoin rate is introduced by the FIG. 3 description.

FIG. 2 is annotated with a series of letters A-B. These letters represent stages of operations, each of which may be one or more operations. Although these stages are ordered for this example, the stages illustrate one example to aid in understanding this disclosure and should not be used to limit the claims. Subject matter falling within the scope of the claims can vary with respect to the order and some of the operations.

At stage A, the AP 212 authors a new assignment block 206 for the distributed ledger 200. The authoring of the new assignment block 206 is based on the solving of a distributed optimization problem which minimizes bandwidth interference for the distributed network. APs may make optimization bids to increase their chances of receiving a better channel in their next channel assignment. Optimization bids are an example of the types of information which may be added to the distributed ledger 200 as a new block.

At stage B, the AP 212 distributes the new assignment block 206 to the neighboring AP 214. The new assignment block 206 is appended to the distributed ledger of the neighboring AP 214 as an update to the distributed ledger. The neighboring AP 214 then distributes the updated distributed ledger to the entire distributed network.

Assignment block 206 has timestamped ChannelCoin balances 208 and channel assignments 210 with values for each AP in the distributed network. The timestamped ChannelCoin balances 208 include a timestamp (denoting the time of the authoring of assignment block 206) and the amount of ChannelCoin that each AP possessed at the denoted time. For example, the timestamped ChannelCoin balances 208 include values for AP 1, AP 2, and AP N in the distributed network. In the shown example, AP 1 has 16 ChannelCoin, AP 2 has −4 ChannelCoin, and AP N has 8 ChannelCoin as of the UTC timestamp (which is 120 seconds after the authoring of the genesis block 202, indicating a 60 second interval between each assignment block being authored). In some cases, updates to ChannelCoin balances may be reported as the change in ChannelCoin balance. In such cases, the new ChannelCoin balance can be calculated and reported to the distributed ledger 200.

The channel assignments 210 comprise a table for each AP in the distributed network with an assigned channel and an associated ChannelCoin rate. The channel assignments 210 cannot be altered by APs until a new optimization is performed and a new assignment block is appended to the distributed ledger 200.

Figure 3:
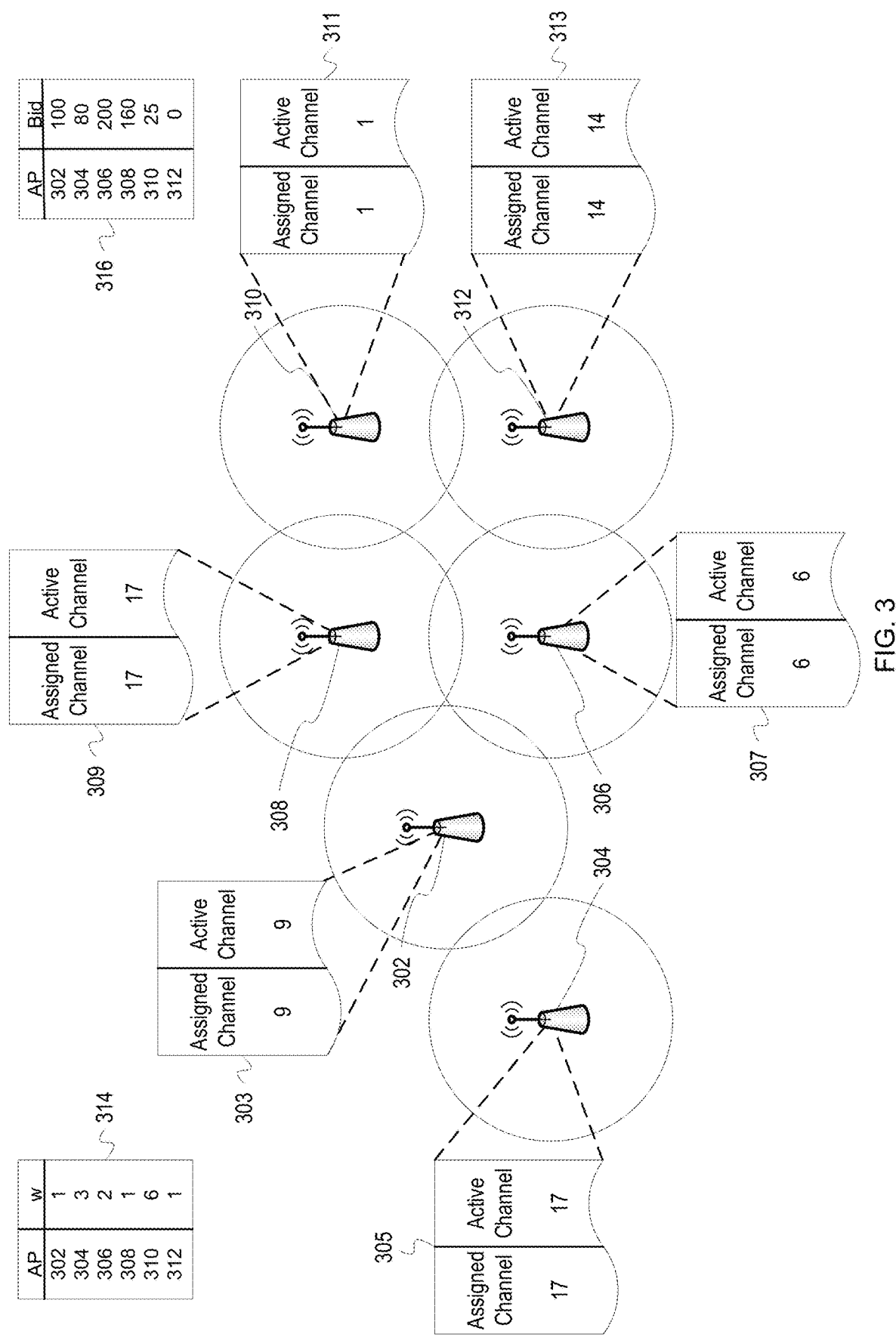
FIG. 3 depicts a distributed network using a Proof of Stake system to author a new assignment block for a distributed ledger.

FIG. 3 depicts a distributed network using a Proof of Stake system to author a new assignment block for a distributed ledger. A distributed network of APs 302, 304, 306, 308, 310, and 312 have channel use tables 303, 305, 307, 309, 311, and 313. A rank table 314 and a bid table 316 track expenditures made by APs for the Proof of Stake system.

APs in the distributed network may spend ChannelCoin in one of two ways. The first way is spending ChannelCoin to make an optimization bid to increase a "weighting", $w_n$. The weighting prioritizes the $n^{th}$ AP during the next channel assignment and may increase the punishment for rogue behavior. Another way of spending ChannelCoin is to spend ChannelCoin to initiate a distributed optimization process. The price for initiating a distributed optimization process can be a fixed price or a price based on the total amount of digital currency available to every AP in the distributed network. This request would be sent to the last AP to author an assignment block, which would record the transaction/request into the distributed ledger.

The rank table 314 includes a weighting based on an optimization bid for each AP in the distributed network. For example, the AP 302 has an optimization bid of 0, which gives a weighting $w_{302}=1$. The weighting of each AP is equal to one plus the sum of optimization bids between optimizations. APs with high bids are given greater consideration when assigning new channels.

The weighting of each AP is used to determine a weighted sacrifice for using the assigned channel, which in turn is used to establish a distributed optimization problem to generate new channel assignments as well as ChannelCoin rates for generated channel assignments. The equation for the weighted sacrifice for using the assigned channel is given by:

$$p_n(x) = w_n * \sum_m I(x, c(m)) \quad (1)$$

Where $p_n(x)$ is the weighted sacrifice for the $n^{th}$ AP using the channel x, $w_n$ is the weighting of the $n^{th}$ AP, m are the APs neighboring the $n^{th}$ AP, and $I(x,c(m))$ is the bandwidth interference between the $n^{th}$ and $m^{th}$ APs based on their channel use (where c(m) is the channel used by the $m^t$ AP). The equation for bandwidth interference between two channels is given by:

$$I(c(n),c(m))=\max(k-|c(n)-c(m)|,0) \quad (2)$$

Where c(n) and c(m) are the channels used by the $n^{th}$ and $m^{th}$ APs, respectively, and k is the channel spacing needed to avoid bandwidth interference. For example, if k=6, then neighboring APs using channel 1 and channel 7 will not have bandwidth interference, but neighboring APs using channel 1 and channel 6 will. The parameter k depends upon the division of channels across a frequency range. In some cases, the parameter k may vary by frequency (i.e. for channel distributions with uneven frequency ranges). In some cases, APs may use channel multiplexing to avoid interference. In such cases, the calculation of bandwidth interference may be altered.

The weighted sacrifice $p_n(x)$ is used to determine ChannelCoin rates for APs which use their assigned channel because it reflects the sacrifice in bandwidth made by the AP in using the assigned channel. As the weighting $w_n$ increases, so does the weighted sacrifice. By using weighted sacrifices, the weighting $w_n$ for each AP scales the weighted sacrifice of particular APs, making the minimization of bandwidth interference for particular APs a greater priority than others.

For example, the channel use table 303 shows that the AP 302 is using its assigned channel (channel 11). The ChannelCoin rate for the AP 302 would be calculated by taking the sum of bandwidth interferences with the neighboring APs 304, 306, and 308 and multiplying by the weighting of the AP 302 ($w_{302}=1$). Thus, if the parameter k=6, then the AP 302 would be given a ChannelCoin rate for using its assigned channel $p_{302}(9)=\max(6-|9-17|,0)+\max(6-|9-6|,0)+\max(6-|9-17|,0)=3$ ChannelCoin.

The bid table 316 includes a channel bid for each AP in the distributed network. A distributed optimization process to generate new channel assignments might be initiated by the passing of a predetermined time interval, a degradation of network performance determined based on the weighted sacrifice of each AP in the distributed network, or the spending of ChannelCoin by APs as channel bids. In some cases, one or all of the APs making channel bids which exceed a predetermined threshold can trigger a distributed optimization process to generate new channel assignments.

The amount of ChannelCoin which may be spent on a channel bid may be limited to a predetermined value. For example, the maximum channel bid may be 200 ChannelCoin. In some cases, the channel bid required for each AP to initiate a distributed optimization process may be different, and may be adjusted to prevent the same AP from repeatedly initiating distributed optimization processes. By limiting the channel bid, APs with a large amount of ChannelCoin are prevented from compromising the distributed network by freely manipulating the distributed ledger. In some cases, the optimization bid of each AP may also be limited. The optimization bid may be limited based on a predetermined value or by a fraction of the total ChannelCoin balance of every AP in the distributed network.

To determine an author for new assignment blocks, each AP may be assigned a numeric range between 0 and 1 so that each AP has a unique range and the range of all APs covers the range of 0 to 1, so that the range of each AP corresponds to their channel bid or ChannelCoin balance. A random number generator can then be used to select a number between 0 and 1, which in turn selects the corresponding AP for the Proof of Stake system to author the new assignment block.

In some cases, the AP which triggers a distributed optimization may also be selected to author the new assignment block. Rogue APs may be ineligible for submitting channel bids, optimization bids, or being selected by the Proof of Stake system as a punishment for their behavior.

Once an AP is selected by the Proof of Stake system to author a new assignment block, a distributed optimization problem is solved to minimize interference of APs in the distributed network. This can be done by finding channels which minimize the sum of the weighted sacrifices (as defined by Eqn. 1) of every AP in the distributed network. Examples of distributed algorithms to solve this type of distributed optimization problem include distributed Nesterov gradient algorithms and augmented Lagrangian methods. Any appropriate distributed algorithm may be used. By using a distributed algorithm, computational load may be spread among APs.

Figure 4:
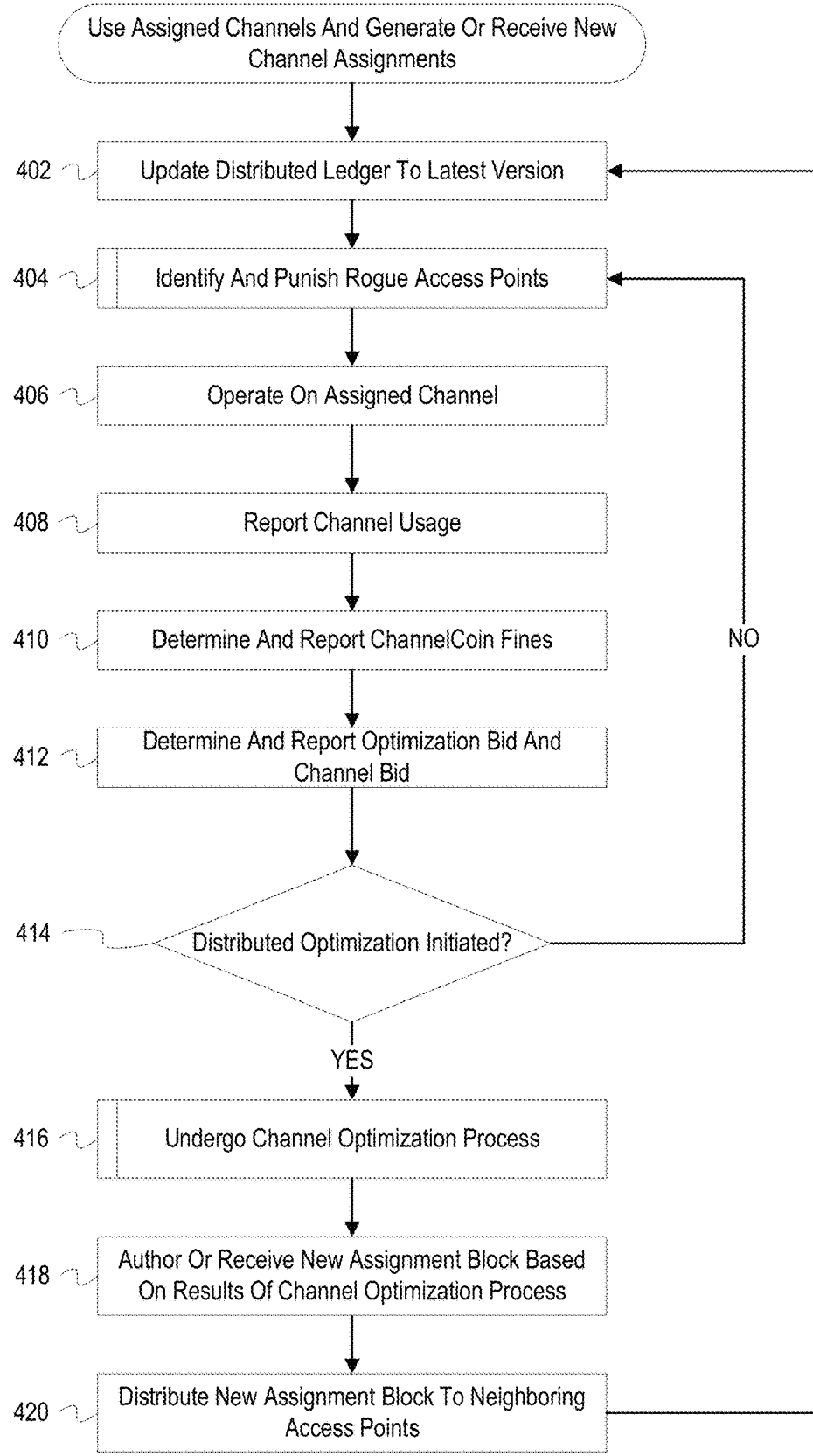
FIG. 4 depicts a flowchart of example operations for access points to use assigned channels and generate or receive new channel assignments.

FIG. 4 depicts a flowchart of example operations for access points to use assigned channels and generate or receive new channel assignments. The description of FIG. 4 refers to the AP as performing the operations. The example operations indicate the selection of a channel(s) by an AP subject to channel assignment, the punishment of rogue APs, and the generation or receipt of new channel assignments based on an assignment block authoring process. Different events can initiate an assignment block authoring process as explained earlier.

At block 402, the AP updates its distributed ledger to the latest version. The AP can request neighboring APs to share their versions of the distributed ledger. Based on the versions of the distributed ledger shared by neighboring APs, the AP can confirm the validity of its distributed ledger and update the distributed ledger with new assignment blocks.

In some cases, an AP joining the distributed network may download the entire distributed ledger from neighboring APs. For example, if a new AP joins the distributed network, then it will request the distributed ledger from any detected neighboring APs. By comparing the received versions of the distributed ledger, the newest version is downloaded, enabling the AP to join the distributed network. The new AP is given a default ChannelCoin rate and channel assignment based on bandwidth interference until it is able to take part in assignment block authoring processes.

At block 404 the AP identifies and punishes rogue access points. A rogue access point is an AP that operates in a manner that can or does reduce network performance and/or stability. This may be passive behavior, such as not participating in assignment block authoring processes, or active, selfish behavior such as not using assigned channels to maximize bandwidth regardless of impact on the distributed network. The identification and punishment of rogue APs is explored in greater detail by the FIG. 5 description below.

At block 406, the AP operates on its assigned channel. The AP receives a new assigned channel at block 402 upon updating its distributed ledger to the latest version. The AP can evaluate its effective bandwidth while operating on its assigned channel to determine optimization bids and channel bids.

At block 408, the AP reports channel usage. Channel usage is shared for the AP and all neighboring APs. The AP can detect the channel use of neighboring APs by sniffing. Based on detected channel use and MAC addresses, the AP can share channel use information for itself and all of its neighboring APs. By reporting channel use, the ability of APs to fabricate channel use information is diminished by having the ability to compare channel use information from different APs.

At block 410, the AP determines and reports ChannelCoin fines. Based on contradictions in reported channel usage among APs from block 408, a fine may be issued to APs which either falsify channel usage information or operate on unassigned channels. The values of the fines may be determined by selecting a predetermined value or based on bandwidth interference induced by not using the assigned channel. For example, if an AP detects a neighboring AP which is assigned channel 4 using channel 8, the AP may determine an appropriate fine of 10 ChannelCoin and report the fine to the distributed network. Based on the confirmation of the behavior of the neighboring AP, the fine can be approved and deducted from the ChannelCoin balance of the neighboring AP. Since the distributed network reaches a consensus on the behavior of the neighboring AP, the issuance of multiple fines for the same behavior can be avoided. In reporting ChannelCoin fines, the ChannelCoin balances for fined APs can be updated. In the previous example of the AP which used channel 8 despite being assigned channel 4 being issued a fine of 10 ChannelCoin, the fine may be reported as changing the ChannelCoin balance of the fined AP from 34 ChannelCoin to 24 ChannelCoin based on a fine of 10 ChannelCoin. ChannelCoin balances may also be changed automatically based on the use of assigned channels (which may be verified by the absence of a fine for not using the assigned channel).

ChannelCoin fines may be issued for the falsification of information on the distributed ledger, not using an assigned channel, or other behavior which is harmful to the stability and performance of the distributed network. ChannelCoin fines may be issued based on a detected inconsistency in the distributed ledger or use of an unassigned channel. In some cases, only the AP which last authored a new assignment block for the distributed ledger may issue fines. The value of each fine may be determined based on at least one of ChannelCoin balance, ChannelCoin rate, weighting $w_n$, and channel assignment. In some cases, ChannelCoin fines may be issued during other stages in FIG. 4.

At block 412, the AP determines and reports an optimization bid and a channel bid. ChannelCoin expenditures comprise optimization bids and channel bids. With reference to FIG. 3, channel bids may be used by APs to initiate a distributed optimization via the Proof of Stake system. A channel bid may be determined based on the AP's current channel assignment, ChannelCoin balance, and ChannelCoin rate. The channel bid of each AP is distributed to neighboring APs until each AP in the distributed network has access to the channel bid of every AP in the distributed network.

The optimization bid (or weighting $w_n$) for each AP can be determined based on the channel assignment, ChannelCoin rate, and ChannelCoin balance of each AP. Upon reporting a channel bid or optimization bid, the bid is deducted from the ChannelCoin balance of the bidding AP.

At block 414, the AP determines whether a distributed optimization has been initiated. The AP may determine whether a distributed optimization process has been initiated based on the outcome of the Proof of Stake system. If a distributed optimization process has not been initiated, then the flow of operations returns to block 404. If a distributed optimization process has been initiated, the flow of operations continues to block 416.

At block 416, the AP undergoes a channel optimization process. With reference to FIG. 3, the channel optimization process comprises minimizing the weighted sacrifice for each AP in the distributed network using a distributed algorithm to generate new channel assignments. Appropriate distributed algorithms include distributed Nesterov gradient algorithms and augmented Lagrangian methods. Each AP in the distributed network takes part in the channel optimization process, which allows the results of the process to be verified by each AP in the distributed network. The channel optimization process results in a list of channel assignments, for which ChannelCoin rates can be determined based on interference.

At block 418, the AP authors or receives a new assignment block based on the results of the channel optimization process. With reference to FIG. 3, the new channel assignments are those which minimize the sum of weighted sacrifice for each AP in the distributed network according to Eqn. 1. After new channel assignments have been generated at block 416, the AP generates ChannelCoin rates according to the bandwidth interference for each assigned channel. For example, if an AP has a large bandwidth interference for its assigned channel, then it will have a large ChannelCoin rate. If an AP has little or no bandwidth interference for its assigned channel, then it will have a small ChannelCoin rate. Regardless of which AP authors the new assignment block for the distributed ledger, the AP will distribute the new information once it is generated or received from neighboring APs. In some cases, the ChannelCoin rate of each assigned channel is determined by Eqn. 1.

At block 420, the AP distributes the new assignment block to neighboring access points. Upon the receipt of a new assignment block, each AP distributes the assignment block to all neighboring APs until the distributed network is updated, which comprises each AP in the distributed network reaching consensus. After block 420, the flow of operations returns to block 402.

In some cases, the distributed ledger may be severed to reduce the amount of storage space it requires. In such cases, the ChannelCoin balances, ChannelCoin rates, and channel assignments can be included on a new genesis block, which no longer requires APs to store previous information. In some cases, previous information may be compressed or combined to reduce storage space for the distributed ledger.

In some cases, the entirety of the distributed ledger may be stored at one or several data repositories severing the distributed ledger.

Figure 5:
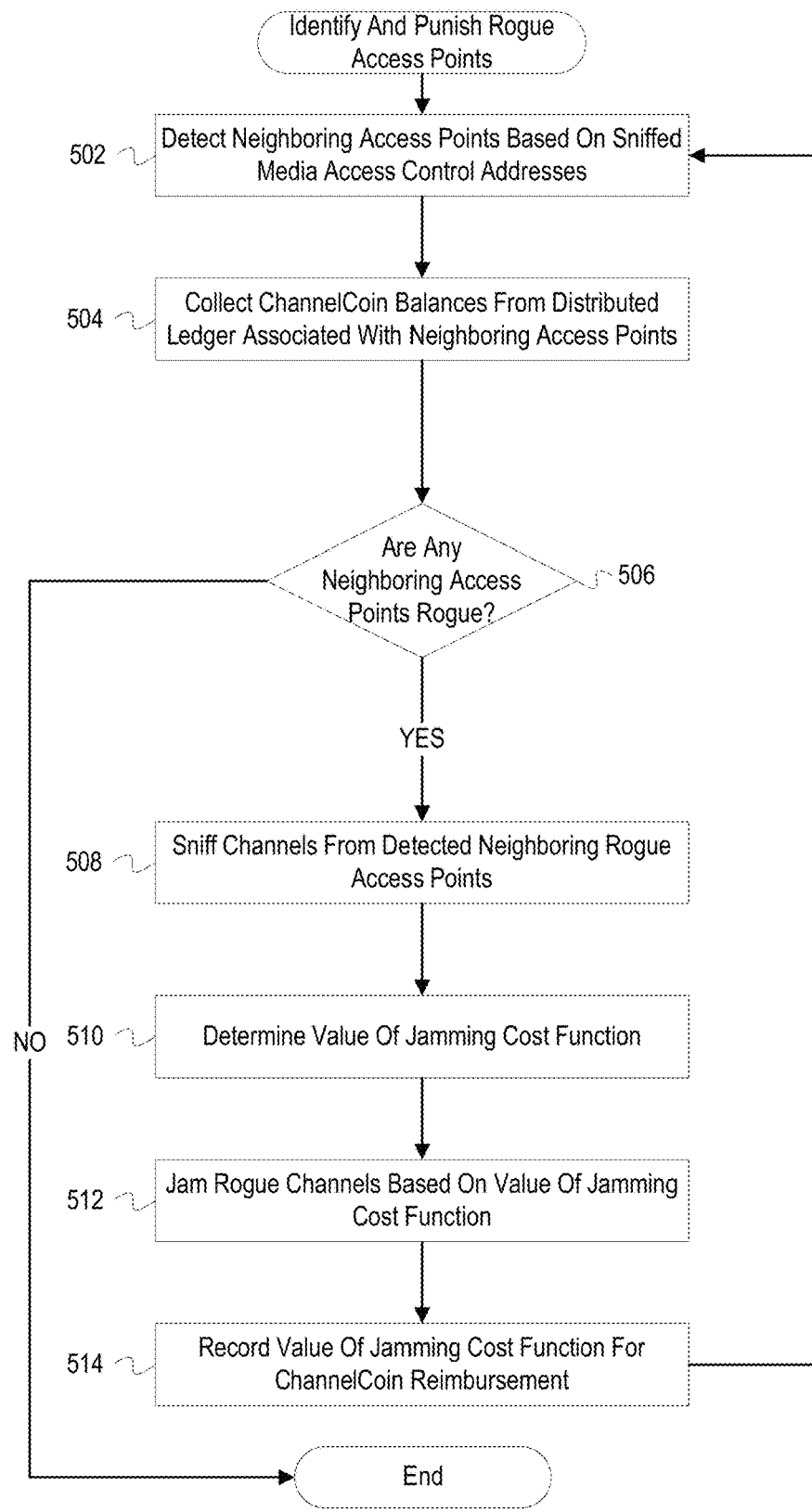
FIG. 5 depicts an AP identifying and punishing rogue access points.

FIG. 5 depicts an AP identifying and punishing rogue access points. A series of operations begins at block 502 with detecting medium access control addresses and ends at block 506 upon the determination that are no neighboring rogue access points are detected. The description of FIG. 5 refers to the AP as performing the operations.

At block 502, the AP detects medium access control addresses of neighboring access points. The detected addresses may be detected by sniffing and are used to identify neighboring APs in the distributed network.

At block 504, the AP collects ChannelCoin balances from the distributed ledger which are associated with neighboring access points. The AP may identify ChannelCoin balances associated with neighboring APs based on the MAC addresses detected at block 502.

At block 506, the AP determines whether any neighboring APs are rogue APs. The AP reads the ChannelCoin balances of the neighboring APs collected at block 504 to determine whether any are negative. A negative value for the ChannelCoin balance indicates that the AP with the associated MAC address is a rogue AP. The AP can search for any negative balances and then filter out those APs that are not neighbors or search for neighboring APs in the distributed ledger and filter out those that do not have a negative ChannelCoin balance. If neighboring rogue APs are detected, then the flow of operations continues to block 508. If neighboring rogue APs are not detected, then the flow of operations ends for identifying and punishing rogues and the AP resumes operations for channel selection. In some cases, APs which do not participate in the distributed ledger based channel assignment may be classified as rogue APs. For example, if a neighboring AP has a MAC address which does not correspond to an AP in the distributed ledger, then there is no indication that it will adjust channel use according to channel assignments on the distributed ledger. For such cases, the neighboring AP may be treated as a rogue AP and jammed accordingly. Because information on such APs is not available on the distributed ledger, predetermined values may be used instead. In some cases, information may be recorded on neighboring APs which are not part of the distributed network of APs to allow appropriate jamming.

At block 508, the AP sniffs channels from detected neighboring rogue access points ("rogue channels"). In some cases, the AP may simultaneously sniff MAC addresses and channels at block 502 and determine channel use for rogue APs upon detecting neighboring rogue APs at block 506.

At block 510, the AP determines the value of a jamming cost function. The jamming cost function is denoted $s_{n,J}$ and describes the sacrifice in bandwidth made by the $n^{th}$ AP jamming the $J^{th}$ channel. The jamming cost function is given by:

$$s_{n,J}(t) = \frac{B_{n,J}}{B_n} \quad (3)$$

The variable $B_{n,J}$ is the bandwidth of the $n^{th}$ AP using the $J^{th}$ channel, $B_n$ is the bandwidth of the $n^{th}$ AP using its assigned channel, and J is a channel detected to be used by a neighboring rogue AP at block 508. In cases where multiple channels are detected to be in use by neighboring rogue APs at block 508, the AP may calculate jamming cost functions for each channel, several channels, or one channel according to the lowest ChannelCoin balance of neighboring rogue APs.

In some cases, punishing APs may use channel use data from the distributed ledger to find other APs neighboring the rogue AP to be jammed. The jamming AP may then coordinate with other APs in the distributed network which neighbor the rogue AP to coordinate jamming and reduce their jamming cost function.

At block 512, the AP jams rogue channels based on the value of the jamming cost function $s_{n,J}$. The duration and intensity of the jamming may be determined based on predetermined thresholds of the value of the jamming cost function $s_{n,J}$. For example, if the value of the jamming cost function is above 0.5 (signifying less than a 50% sacrifice in available bandwidth), the AP may jam rogue channels for 10 seconds, whereas if the value of the jamming cost function is below 0.5, the AP may jam rogue channels for only 5 seconds. In some cases, the AP may use any appropriate Byzantine fault tolerant algorithm to coordinate jamming with other APs in the distributed network that neighbor the same rogue APs. By doing so, the cost of jamming can be reduced for each jamming AP.

In some cases, APs may not jam rogue APs. For example, a neighboring rogue AP may continue to operate on the same channel despite being jammed indefinitely. In this case, continuing to jam the rogue AP would preclude the ability of jamming APs to operate on their assigned channels. Thus, an AP may regulate its sacrifice due to jamming based on various factors. Examples of the factors or conditions evaluated by an AP in determining whether to cease (or skip) jamming include past behavior of neighboring rogue APs, the amount of time spent jamming neighboring rogue APs, or a combination thereof. In such cases, APs which do not jam rogue APs may be issued a ChannelCoin fine. In some cases, the APs may be provided a mechanism to report rogue APs to prevent further ChannelCoin fines for not jamming the rogue APs.

At block 514, the AP records the value of the jamming cost function for ChannelCoin reimbursement. In order to incentivize APs to punish neighboring rogue APs, the sacrifice made in bandwidth can be reimbursed based on the value of the jamming cost function. In some cases, APs may determine jamming rogue channels to be inefficient.

To be reimbursed, the AP may append the cost of jamming to the distributed ledger. Non-rogue APs neighboring the AP may confirm the channel use during jamming.

After the operations of block 514, the flow of operations returns to block 502. The operations of blocks 502-514 continue until it is determined at block 506 that there is no neighboring rogue access points are detected. In some cases, APs which choose not to jam rogue channels based on the value of the jamming cost function at block 512 may end the flow of operations and return to standard operations. In some cases, APs which do not jam rogue channels are given a ChannelCoin fine.

Figure 6:
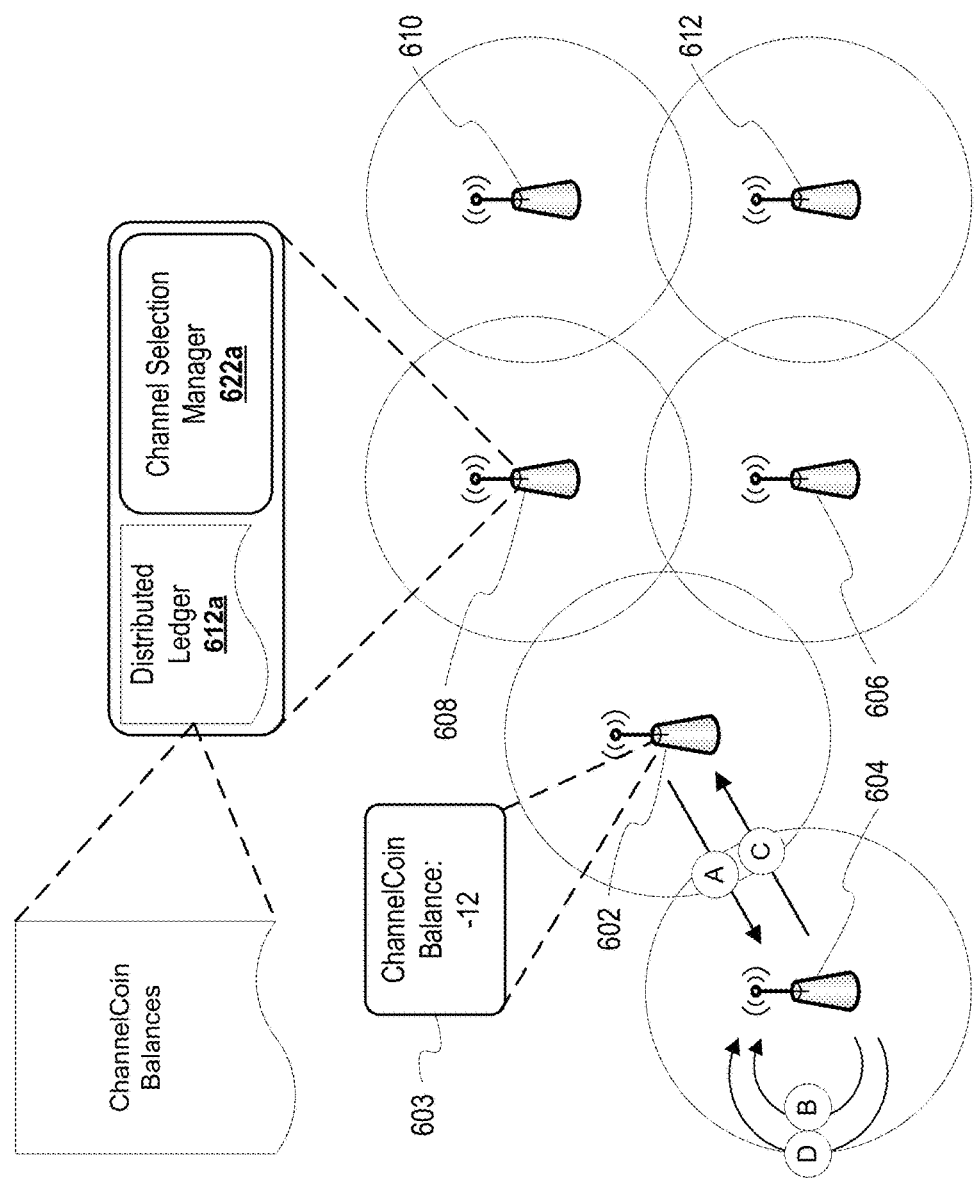
FIG. 6 depicts a rogue AP being jammed by neighboring APs.

FIG. 6 depicts a rogue AP being jammed by neighboring APs. A rogue AP 602, neighboring APs 604, 606, and 608, and APs 610 and 612 are part of a distributed network. The rogue AP 602 has a negative ChannelCoin balance 603. The AP 608 has a distributed ledger 612a and a channel selection manager 622a. Each of the APs 602, 604, 606, 610, and 612 have similar distributed ledgers and channel selection managers. The APs 610 and 612 do not take part in the jamming process because they do not neighbor the rogue AP 602.

FIG. 6 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

With reference to FIG. 1, the rogue punisher 126a may control the operations of stages A-D. An AP may detect rogue APs based on the detection of nearby APs with MAC addresses associated with negative ChannelCoin balances accessible in the distributed ledger.

During the stages A-D, the neighboring AP 604 detects and punishes the rogue AP 602. Upon AP 602 becoming a rogue AP, each neighboring AP 604, 606, and 608 will undergo stages A-D to detect and punish the rogue AP 602.

At stage A, the neighboring AP 604 detects the MAC address of all adjacent APs in the distributed network. The neighboring AP 604 then accesses the distributed ledger to assess the ChannelCoin balance of each neighboring AP based on detected MAC addresses. Based on the negative ChannelCoin balance 603 of the rogue AP 602 adjacent to the neighboring AP 604, the neighboring AP 604 identifies the AP 602 as a rogue AP and continues to stage B. If multiple rogue APs are detected at stage A, then stages B-D may occur sequentially or in parallel for each rogue AP. If no rogue APs are detected at stage A, then stages B-D may be omitted.

The detection of rogue APs may occur at predetermined time intervals. For example, each AP in the distributed network may detect nearby MAC addresses once every hour and evaluate their ChannelCoin balances to detect rogue APs. The use of a distributed ledger allows the ChannelCoin balance of each AP in the distributed network to be known to every AP in the distributed network. An AP may also evaluate digital currency balances when a new assignment block of the ledger is received to determine whether any are negative for neighboring APs.

At stage B, the cost function $s_{n,j}$ of Eqn. 3 may be used by the AP 604 to determine the sacrifice required to jam the rogue AP 602. Once the AP 604 has calculated the sacrifice required to jam the rogue AP 602 with an appropriate cost function, an appropriate punishment intensity is selected.

Rogue AP channel use may be determined by the detection of channel use of the rogue AP 602 by neighboring APs 604, 606, and 608 based on sniffing channels and MAC addresses. Each of the neighboring APs 604, 606, and 608 may jam one or more channels used by the rogue AP 602. The cost function for jamming multiple channels is given by averaging the cost function for each individual rogue channel.

At stage C, the neighboring AP 604 can jam the rogue AP 602 based on the detection of the negative ChannelCoin balance 603, MAC address, and channel use for the rogue AP 602. Channels can be detected and jammed using various methods, such as a constant jammer, a random jammer or a reactive jammer. There exist various resources for jamming signals including modules and APIs available to the APs 604, 606, and 608. With reference to FIG. 1, jamming operations are controlled by the rogue punisher 126a.

The magnitude of the negative ChannelCoin balance 603 of the rogue AP 602 may be used to determine the intensity of the signal jamming punishment. In some cases, neighboring APs 604, 606, and 608 may be rewarded ChannelCoin for punishing rogue APs. For example, based on the sacrifice of neighboring APs 604, 606, and 608 in jamming the rogue AP 602 (as calculated by Eqn. 3), the neighboring APs 604, 606, and 608 may be reimbursed ChannelCoin lost during jamming (which may require the use of unassigned channels) or rewarded for jamming the rogue AP 602. Using Eqn. 3 ensures a known sacrifice for the bandwidth of the jamming APs 604, 606, and 608 and allows reward or reimbursement for bandwidth sacrificed during the jamming process.

In some cases, jamming intensity may be varied by altering the duration or amount of noise produced while jamming. The neighboring APs 604, 606, and 608 may also coordinate jamming to minimize sacrifice for each individual neighboring AP while successfully jamming the rogue AP 602. In some cases, neighboring APs may take turns jamming the rogue AP 602 or may intermittently jam the rogue AP 602.

At stage D, the neighboring APs 604, 606, and 608 reevaluate the ChannelCoin balance of the rogue AP 602 to determine the need for further punishment. If the AP 602 is still a rogue AP, then the neighboring APs may return to stage B to further punish the rogue AP 602.

Variations

The channel assignment mechanism above may also be applied to cell channel allocation. This can include OFDMA with DCA, so that different carriers or individuals can operate using the channel assignment mechanism.

The examples often refer to a "channel selection manager." The channel selection manager is a construct used to refer to implementation of functionality for channel selection, rogue AP identification and punishment, channel bidding in the Proof of Stake system, and authoring new blocks for the distributed ledger. This construct is utilized since numerous implementations are possible. A channel selection manager may be a particular component or components of a machine (e.g., a particular circuit card enclosed in a housing with other circuit cards/boards), machine-executable program or programs (e.g., software on a wireless router), firmware, a circuit card with circuitry configured and programmed with firmware for channel selection, rogue AP identification and punishment, channel bidding in the Proof of Stake system, the authoring of new blocks for the distributed ledger, etc. The term is used to efficiently explain content of the disclosure.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 512-514 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
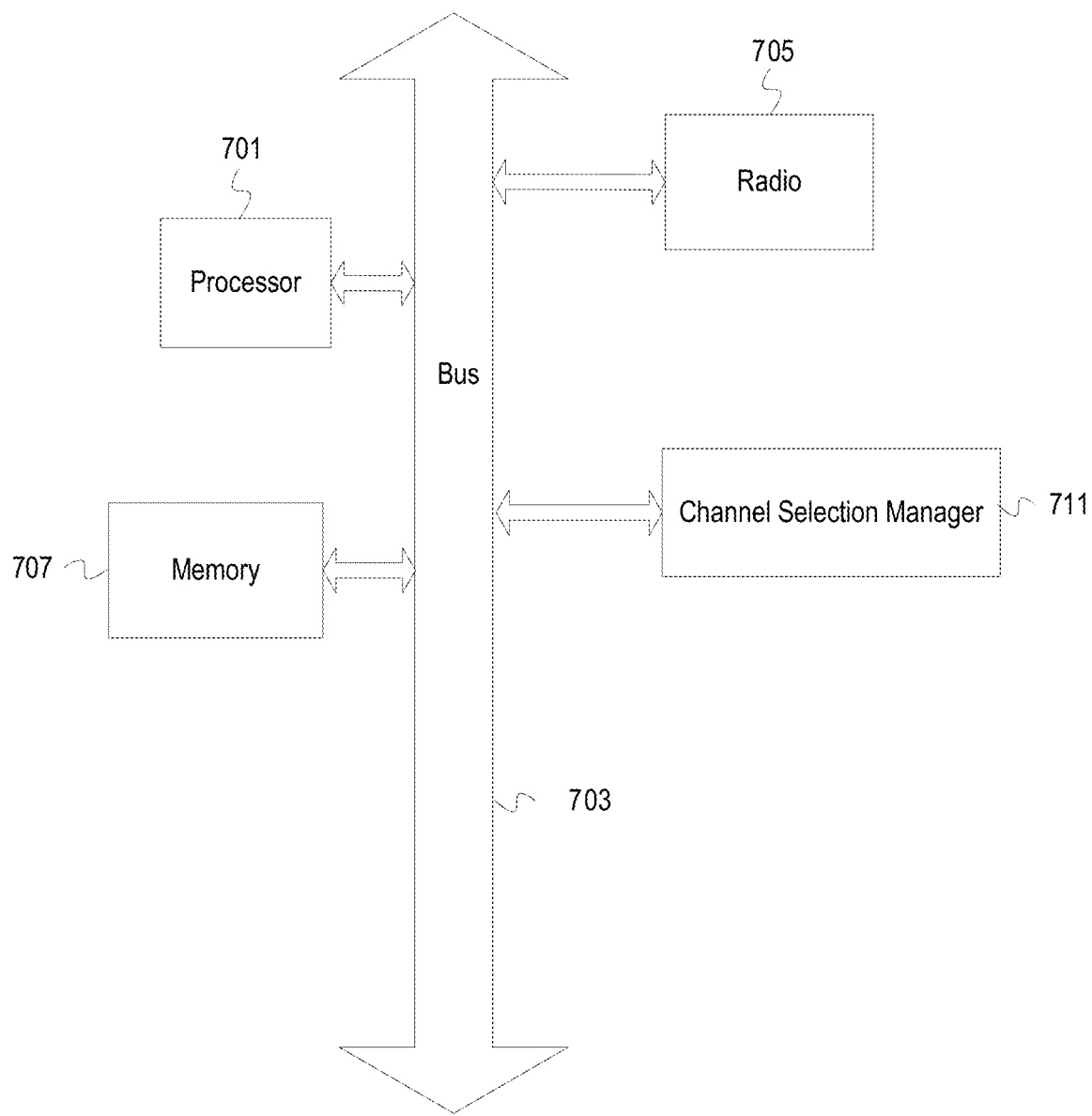
FIG. 7 depicts an example computer system with a channel assignment manager.

FIG. 7 depicts an example access point with a channel selection manager 711. The computer system includes a processor 701 (possibly including multiple processors, multiple cores, multiple nodes, and/or implementing multithreading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport® bus, InfiniBand® bus, NuBus, etc.) and a radio system 705. The radio system "radio" 705 includes components to transmit and receive data wirelessly (e.g., transmitter, receiver, antennae, modulator, etc.). The system also includes the channel selection manager 711. The channel selection manager 711 selects a wireless channel(s) that includes digital currency earning rate as a factor in selecting a channel(s) in addition to bandwidth. The addition of the digital currency earning rate as a factor allows for self interested channel selection without degrading network stability and/or performance which can occur when all APs are trying to maximize bandwidth. The channel selection manager 711 controls operations to undergo channel selection, rogue AP identification and punishment, channel bidding in the Proof of Stake system, and the authoring of new blocks for the distributed ledger. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for channel assignment as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   participating, by a first access point of a plurality of access points, in a distributed optimization process to determine wireless channel assignments for the plurality of access points, wherein participating in the distributed optimization process at least comprises the first access point communicating to neighboring access points of the plurality of access points a set of bandwidth sacrifice values that represent bandwidth sacrifice by the first access point using a currently assigned wireless channel instead of other available wireless channels; and obtaining a first block of a distributed ledger,
wherein the first block indicates a first channel assignment for the first access point and a first digital currency earning rate for the first access point,
wherein the digital currency earning rate and the first channel assignment are based at least partly on the set of bandwidth sacrifice values; and communicating the obtained block to at least a first neighboring access point of the neighboring access points.

2. The method of claim 1, further comprising selecting a first channel based on the first channel assignment.

3. The method of claim 1, further comprising initiating the distributed optimization process based on at least one of expiration of a time interval, detection of a changing network performance, and a bid of digital currency to obtain new channel assignments by at least a first of the plurality of access points.

4. The method of claim 3 further comprising detecting the change in network performance based on detecting a change in bandwidth sacrifice values of at least one of the plurality of access points.

5. The method of claim 1, wherein obtaining the first block comprises authoring the first block, and wherein participating in the distributed optimization process comprises the first access point determining a set of wireless channel assignments across the plurality of access points that minimizes aggregate bandwidth sacrifice across the plurality of access points based on the bandwidth sacrifice values communicated from the plurality of access points.

6. The method of claim 5, wherein determining the set of wireless channel assignments across the plurality of access points that minimizes aggregate bandwidth sacrifice across the plurality of access points also comprises calculating bandwidth interference among the plurality of access points for the wireless channels.

7. The method of claim 1 further comprising indicating to the neighboring access points bandwidth available to the first access point on each of the wireless channels.

8. The method of claim 1 further comprising determining whether an access point should be punished.

9. The method of claim 8, wherein determining whether an access point should be punished comprises determining at least one of whether an access point is indicated in the distributed ledger, whether the distributed ledger indicates a negative digital currency balance for an access point, whether an access point reports information that is inconsistent with information about the access point as indicated in the distributed ledger, and whether an access point is operating on a wireless channel other than the one assigned to the access point in the distributed ledger.

10. The method of claim 8 further comprising punishing the access point based, at least in part, on a determination that the access point should be punished.

11. The method of claim 10, wherein punishing the access point comprises jamming the access point.

12. The method of claim 10, wherein punishing the access point comprises updating the distributed ledger to assess a digital currency fine against the access point.

13. The method of claim 1, wherein participating also comprises the first access point communicating a digital currency balance of the first access point and current channel use by the first access point to neighboring access points.

14. The method of claim 1 further comprising the first access point initiating an optimization bid to change a bandwidth sacrifice weight of the first access point.

15. A non-transitory, computer-readable medium having instructions stored thereon that are executable by a first access point to perform operations comprising:
obtaining bandwidth sacrifice values from access points of a network, wherein the bandwidth sacrifice values represent bandwidth sacrifice by the access points using currently assigned wireless channels instead of other available wireless channels in the network;
determining a set of wireless channel assignments for the access points that minimizes bandwidth sacrifice summed across the access points, wherein the determining the set of wireless channel assignments is based, at least in part, on the bandwidth sacrifice values; and
updating a distributed ledger to indicate the set of wireless channel assignments and digital currency earning rates for the access points based on the set of wireless channel assignments.

16. The non-transitory, computer-readable medium of claim 15, wherein updating the distributed ledger further comprises updating the distributed ledger to indicate a digital currency balance for at least a first access point based on prior wireless channel use by the first access point, prior wireless channel assignment for the first access point, and a prior digital currency earning rate for the first access point that corresponds to the prior channel assignment.

17. The non-transitory, computer-readable medium of claim 16, wherein updating the distributed ledger to indicate the digital currency balance for the first access point is also based on a fine assessed against the first access point.

18. The non-transitory, computer-readable medium of claim 15, wherein the operations further comprise generating a distributed ledger block with the set of wireless channel assignments and digital currency earning rates.

19. A network access point comprising:
a processor;
a radio; and
a machine-readable medium having program code executable by the processor to cause the network access point to,
maintain a distributed ledger that indicates assignments of a plurality of channels configured for the radio to network access points neighboring the network access point and that indicates digital currency earning rates for the plurality of channels;
initiate a bid to obtain a new channel assignment for the network access point based on detection of at least one of change in network performance and expiration of a time period; and
initiate an optimization bid to increase weighting of bandwidth sacrifice for the network access point based on detection of an indication to obtain greater bandwidth for the network access point,
wherein the program code to maintain the distributed ledger comprises program code to update the digital currency earning rates and channel assignments based on a distributed optimization process that determines a set of channel assignments that minimizes bandwidth sacrifice across the network access point and neighboring network access points.

20. The network access point of claim 19, wherein the machine-readable medium further has program code executable by the processor to cause the network access point to jam a neighboring network access point based, at least in part, on a determination that the distributed ledger indicates that the neighboring access point has a negative digital currency balance or that the neighboring access point is not indicated in the distributed ledger.

\* \* \* \* \*